Oct. 28, 1941.  C. MILLER  2,260,689
ICE CREAM SCOOP
Filed April 18, 1939  2 Sheets-Sheet 1
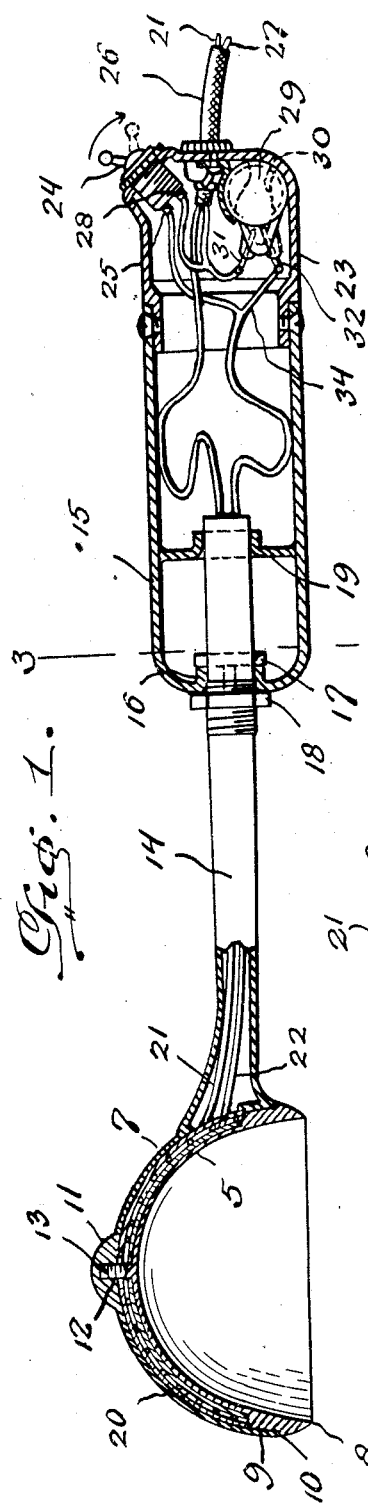
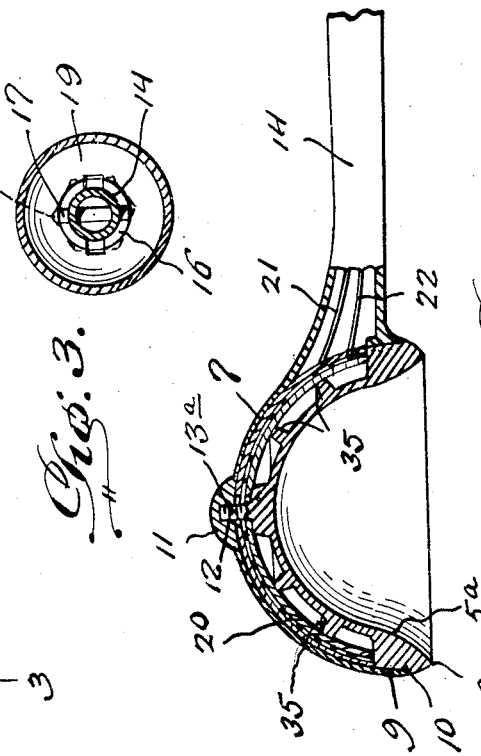
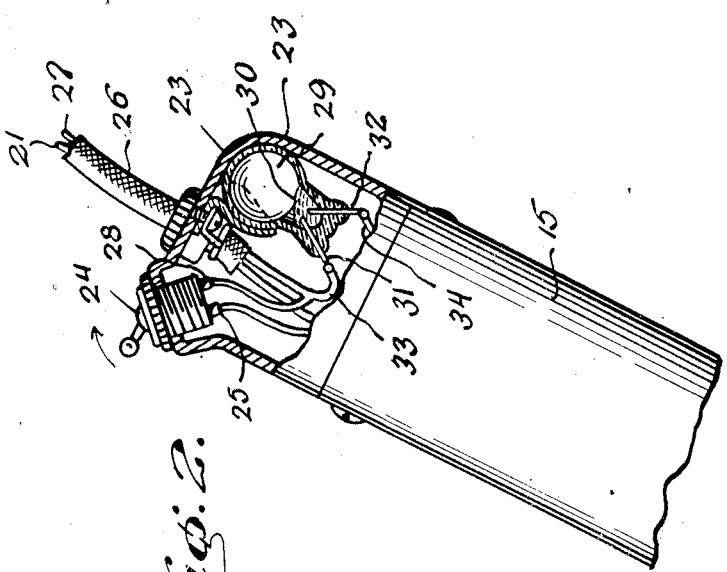
Inventor
Carroll Miller,
By J. Stanley Burch
Attorney Oct. 28, 1941.   C. MILLER   2,260,689
ICE CREAM SCOOP
Filed April 18, 1939   2 Sheets-Sheet 2
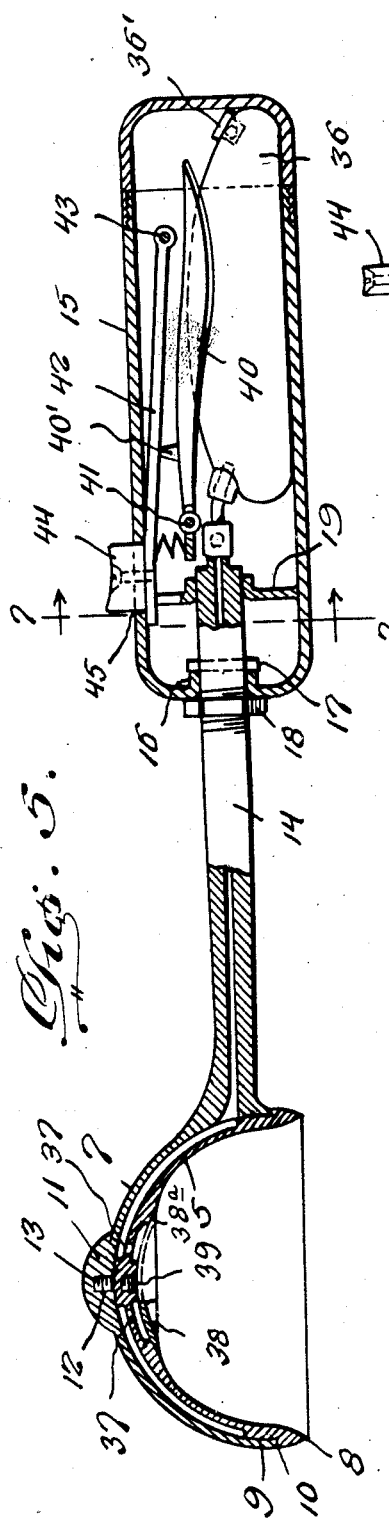
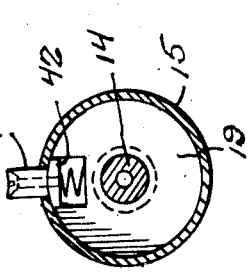
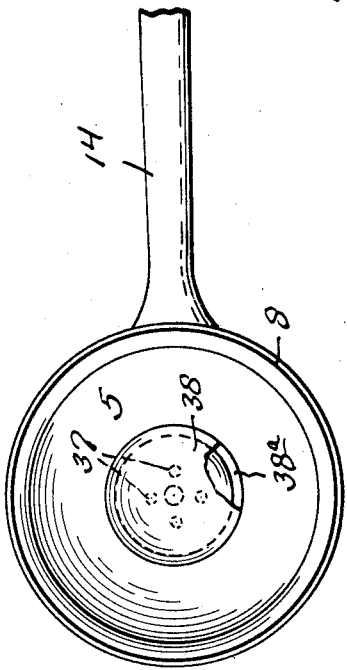
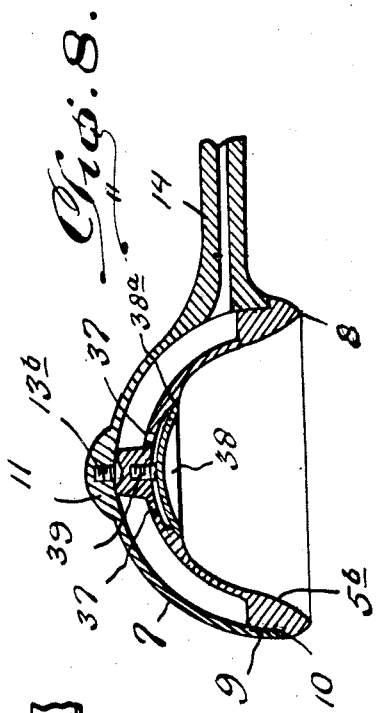
Inventor
Carroll Miller,
By J. Stanley Burch
Attorney Patented Oct. 28, 1941

2,260,689

UNITED STATES PATENT OFFICE 2,260,689

ICE CREAM SCOOP

Carroll Miller, Andrew, Iowa

Application April 18, 1939, Serial No. 268,569

4 Claims. (Cl. 219—21)

This invention relates to an ice cream scoop provided with means to loosen the ice cream with respect to the bowl of the scoop so as to facilitate emptying the latter.

An object of the present invention is to provide a scoop of the above kind including a bowl consisting of inner and outer wall sections uniformly spaced apart to provide a chamber between them, novel means for detachably securing said wall sections together whereby inner wall sections having cavities of different sizes may be interchangeably employed for varying the capacity of the scoop, and means utilizing said chamber for loosening the ice cream with respect to the bowl of the scoop.

Another object of the present invention is to provide a scoop of the above kind having means to electrically heat the bowl thereof and thereby loosen the ice cream so that the scoop may be readily emptied, and means to automatically break the circuit of said electrical heating means when the scoop is laid in a substantially horizontal position and not in use and for automatically closing the circuit of said heating means when the scoop is moved from such substantially horizontal position as in the act of scooping ice cream.

Another object of the present invention is to provide a scoop of the above kind having a handle provided with means for forcing air into the chamber provided between the inner and outer wall sections of the bowl of the scoop, the inner wall section of the bowl having apertures through which the air may pass from said chamber to flow between the ice cream and the inner wall section and thereby loosen the ice cream so that the scoop may be readily emptied.

The present invention also comprises certain other novel features, details of construction, and combinations of parts that will become apparent from the following description when considered in connection with the accompanying drawings, in which:

Figure 1 is a view partly in central longitudinal section and partly in side elevation, of an ice cream scoop constructed in accordance with the present invention and embodying an electrical heating means for the scoop bowl.

Figure 2 is an enlarged fragmentary view of the handle portion of the scoop shown in Figure 1, parts being broken away and in section to reveal the action of the circuit closer in closing the circuit of the electrical heating means when the scoop is moved from a substantially horizontal position to an operative position as assumed in dipping ice cream.

Figure 3 is a transverse section on line 3—3 of Figure 1.

Figure 4 is a fragmentary view, partly in section, showing the bowl of the scoop shown in Figure 1 with the regular inner wall section removed and another inner wall section substituted therefor so as to decrease the capacity of the bowl.

Figure 5 is a view similar to Figure 1 of a modified form of the present invention having pneumatic means for loosening the ice cream with respect to the bowl of the scoop.

Figure 6 is a fragmentary view showing the bowl and shank of the scoop shown in Figure 5, the view being taken looking toward the mouth of the bowl.

Figure 7 is a transverse section on line 7—7 of Figure 5; and

Figure 8 is a view similar to Figure 4 showing an inner wall section substituted for the inner wall section of the bowl of the scoop shown in Figure 5 so as to decrease the capacity of said bowl.

Referring in detail to the drawings, the present scoop includes a bowl consisting of an inner wall section 5 and an outer wall section 7 in the form of substantially semi-spherical shells and uniformly spaced apart to provide a chamber between them. The edge portion of the inner wall section 5 is sharpened as at 8 to form a cutting edge or lip for the bowl, and said inner wall section 5 is rotatably fitted as at 9 adjacent said lip within the edge or lip portion of the outer wall section 7, a shoulder 10 being formed on the inner wall section 5 and extending over the edge of the outer wall section 7. Also, the outer wall section 7 has a thickened central portion 11 provided with a threaded socket 12 and receiving a threaded stem 13 provided centrally on the inner wall section 5. Thus, by rotating the inner wall section 5, the stem 13 may be threaded into the socket 12 so that the wall sections are detachably secured together.

Rigid with and extending laterally from the outer wall section 7 of the bowl is a hollow shank 14 whose outer end is fitted and secured within one end of an elongated hollow handle member 15. As shown, an end of the handle 15 has a central opening through which the shank 14 extends and is formed about this opening with an inturned flange 16 having diametric notches in which are engaged the projecting ends of a transverse pin 17 extending through shank 14.

A nut 18 is threaded on the shank 14 against the adjacent end of handle 15 outside the latter so that the handle and shank are firmly secured together. The shank 14 also preferably extends into the central opening of a transverse member 19 fixed within the handle 15 so as to insure rigid relationship between the handle and the shank. By removing the inner wall section 5, another inner wall section 5a or 5b of similar general form but having a smaller cavity, may be substituted therefor as respectively shown in Figures 4 and 8 so as to decrease the capacity of the bowl of the scoop, depending upon the quantity of ice cream to be dipped. The substitute inner wall section 5a has a threaded stem 13a to be received in the socket 12 the same as the stem 13 of the wall section 5 is received therein, and a corresponding threaded stem 13b for a similar purpose is provided on the substitute inner wall section 5b of Figure 8. The only difference in the general construction and appearance of the bowl is that the same is of greater or lesser capacity, depending upon the character of inner wall section employed, and the chamber between the wall sections is larger in the cases where the substitute inner wall section is provided.

Means, utilizing the chamber between the inner and outer wall sections, is provided for loosening the ice cream with respect to the bowl of the scoop. As shown in Figures 1 to 4 inclusive, this means may include an electrical heating element 20 arranged in the chamber between the wall sections of the bowl and adapted to facilitate penetration of the ice cream with the edge of the scoop in addition to loosening the ice cream with respect to the bowl. The heating element 20 is of course suitably insulated, and it is supplied with electric current through leads 21 and 22 extending from within the handle 15 through the shank 14 to the heating element. The handle 15 preferably has a removable outer end section 23 in which is mounted a manually operable switch 24 for manually controlling the heating element, lead 22 being connected to one terminal of switch 24 as at 25, and the other lead 21 extending to and forming part of an attachment cord 26 running outwardly from the outer end of handle 15 and having an attachment plug, not shown, to connect it with any suitable electric fixture. The attachment cord 26 includes another wire or lead 27 connected to the other terminal of switch 24 as at 28.

While the manually operable switch 24 may be employed when desired for any special reason, it is contemplated, under ordinary conditions, to automatically control the heating element 20 by means of a mercury tube switch generally indicated at 29 and arranged with the detachable end section 23 of handle 15. This mercury tube switch is arranged so that the circuit of heating element 20 will be automatically broken when the scoop is laid in a substantially horizontal position as shown in Figure 1 and as is ordinarily done when the scoop is not in use, and to automatically close the circuit of said heating element when the scoop is lifted from such substantially horizontal position as illustrated in Figure 2 and as occurs when the scoop is being used. Besides eliminating a manual circuit closing operation, this arrangement will greatly conserve current by having the heating element operative only when required. Of course, should the scoop be held so as to keep the circuit of the heating element closed for an undue length of time, overheating may be prevented by operation of the manually operable switch 24. The mercury tube switch 29 is of an old and well known type and forms no part of the present invention per se. Suffice it to say that the mercury in the tube of this switch will flow into the large portion of the tube and break the connection between the contacts within said tube when the scoop is laid in a substantially horizontal position, but said mercury will flow into the smaller end portion of the tube and bridge said contacts for closing the circuit of the heating element when the scoop is moved from a substantially horizontal position as shown in Figure 2. The mercury of the switch is indicated at 30 and the contacts at 31 and 32, one of the latter being connected by a branch lead 33 with lead wire 27 and the other being connected with lead 22 by a branch lead 34.

In order to maintain the heating element 20 in proper position when the inner wall section 5a is substituted for the inner wall section 5 as shown in Figure 4, said substitute inner wall section 5a may be provided with a plurality of outwardly projecting lugs 35 arranged to contact the inner surface of the heating element 20 and to conduct the heat to the wall section 5a.

In the embodiment of Figure 5, pneumatic means is provided for loosening the ice cream with respect to the bowl of the scoop, and such pneumatic means includes a bulb pump 36 arranged in the handle 15 having an air inlet valve 36', and communicating with the shank 14 for forcing air through the latter into the chamber between the wall sections 5 and 7 or 5b and 7. The inner wall sections 5 or 5b of this embodiment are provided near the center thereof with a plurality of openings 37 through which the air may flow from the chamber between the wall sections of the bowl to between the ice cream and the inner wall section so as to loosen the ice cream. To facilitate flow of the air evenly in all directions outwardly from the openings 37, a flexible deflector disk of dished form is carried by the inner wall section 5 or 5b as at 38. This deflector or baffle disk may have a threaded stem 39 detachably threaded into a central threaded socket of the wall section 5 or 5b as shown clearly in Figures 5 and 8, for detachably securing the baffle disk 38 in place. The deflector disk 38 may be countersunk in the wall section 5 or 5b and seated at its margin on a shoulder 38a of the central depressed portion of said wall section to prevent passage of liquid or ice cream under said deflector disk and into the chamber between the wall sections of the bowl. At the same time, the margin of deflector disk 38 will be flexed away from the shoulder or seat 38a when the air is forced through the openings 37, thereby allowing the air to pass between the wall section 5 or 5b and the ice cream for loosening the latter. Manually operable means is carried by the handle 15 for compressing the bulb pump 36 so as to force the air through the shank 14 into the chamber between the wall sections of the bowl and outwardly through the openings or apertures 37 as described. This means may consist of a pivoted lever 40 mounted near one end as at 41 within the handle 15 and bearing at its other end upon the bulb pump 36, and a second lever 42 pivoted at one end as at 43 within the handle 15 and extending across an upstanding lug 40' provided on the longer end of the lever 40 between the ends of the latter. The lever 42 has a finger piece or button 44 projecting outwardly through an opening 45 in the handle 15 so that the lever 42 may be depressed by the finger, the leverage being multiplied through the lever system described so that effective compression of bulb pump 36 is had by a comparatively small degree of movement of lever 42. The handle 15 may be gripped without touching the button 44 when dishing the ice cream, and when it is desired to loosen the ice cream from the bowl of the dipper, the button 44 can then be readily depressed by the finger or thumb so as to cause the air to be forced between the ice cream and the inner wall section of the scoop bowl as above set forth.

From the foregoing description, it is believed that the construction and operation of both forms of the invention illustrated will be readily understood and appreciated by those skilled in the art. It will be seen that the construction is durable and compact, and the parts are so constructed and combined as to provide for economical manufacture. Minor changes in the details of construction illustrated and described are contemplated, such as fairly fall within the spirit and scope of the appended claims.

What I claim as new is:

1. In an ice cream scoop, a bowl consisting of an inner wall section and an outer wall section in the form of substantially semi-spherical shells and uniformly spaced apart to provide a chamber between them adapted for reception of a medium to loosen the ice cream with respect to the bowl, the edge portion of the inner wall section forming a cutting lip for the bowl, said inner wall section being smooth and rotatably fitted adjacent said lip within the lip portion of the outer wall section, said outer wall section being provided with a thickened central portion having a threaded socket, and a threaded stem provided centrally on and rigid with the inner wall section and detachably threaded in said socket by relative rotation of said wall sections to detachably secure the wall sections together, and a handle rigid with said outer wall section.

2. In an ice cream scoop, a bowl consisting of inner and outer wall sections in the form of substantially semi-spherical shells and uniformly spaced apart to provide an air chamber between them, the inner wall section having air escape openings near the center thereof, a hollow shank rigid with the outer wall section and extending laterally therefrom with the bore thereof in communication with said chamber, a hollow handle on the outer end of said shank, a bulb-type air pump arranged within said handle and operable for forcing the air through said shank into said chamber and from said chamber through said air escape openings to loosen the ice cream with respect to said bowl, said handle having a side opening, a lever pivoted at one end within the handle and bearing at its other end upon said pump, said lever having an outwardly directed lug intermediate the ends thereof, a second lever pivoted at one end near the free end of the first-named lever and extending across said lug, and a button on the free end of said second lever projecting through said side opening of the handle so that it may be depressed to operate the pump.

3. In an ice cream scoop, a bowl consisting of inner and outer wall sections in the form of substantially semi-spherical shells and uniformly spaced apart to provide an air chamber between them, the inner wall sections having air escape openings near the center thereof, a hollow shank rigid with the outer wall section and extending laterally therefrom with the bore thereof in communication with said chamber, a hollow handle on the outer end of said shank, a bulb-type air pump arranged within said handle and operable for forcing the air through said shank into said chamber and from said chamber through said air escape openings to loosen the ice cream with respect to said bowl, and a flexible deflector disk of dished form centrally carried by said inner wall section so as to overlie said air escape openings, the margin of said deflector disk being normally seated against said inner wall section but being adapted to be flexed away from the latter by the pressure of the air forced through said air escape openings upon operation of said pump.

4. In an ice cream scoop, a bowl consisting of inner and outer wall sections in the form of substantially semi-spherical shells and uniformly spaced apart to provide an air chamber between them, the inner wall section having air escape openings near the center thereof, a hollow shank rigid with the outer wall section and extending laterally therefrom with the bore thereof in communication with said chamber, a hollow handle on the outer end of said shank, a bulb-type air pump arranged within said handle and operable for forcing the air through said shank into said chamber and from said chamber through said air escape openings to loosen the ice cream with respect to said bowl, and a flexible deflector disk of dished form centrally carried by said inner wall section so as to overlie said air escape openings, the margin of said deflector disk being normally seated against said inner wall section but being adapted to be flexed away from the latter by the pressure of the air forced through said air escape openings upon operation of said pump, said inner wall section having a threaded socket, said deflector disk having a threaded stem detachably threaded into said socket.

CARROLL MILLER.